March 12, 1940.   T. L. FAWICK   2,193,481
CLUTCH
Filed Sept. 10, 1938

INVENTOR
Thomas L. Fawick
BY
Willard D. Eakin
ATTORNEY

Patented Mar. 12, 1940

2,193,481

UNITED STATES PATENT OFFICE 2,193,481

CLUTCH

Thomas L. Fawick, Akron, Ohio, assignor to The Fawick Company, Inc., Wabash, Ind., a corporation of Indiana Application September 10, 1938, Serial No. 229,303

11 Claims. (Cl. 192—88)

This invention relates to clutches or the like and especially those of the type in which an elastic fluid-container is charged and vented for engaging and disengaging the assembly.

In such assemblies, especially when the elastic fluid-container is mounted on the inner member, clutch-disengagement may be undesirably delayed, after the fluid-container has been vented, by centrifugal force of parts of the rapidly rotating fluid container, especially in its longitudinally disposed middle zone, in the absence of precaution such as that of the present invention, of which the chief objects are to avoid such undesirable delay of clutch disengagement, with or without the application of suction to the interior of the fluid container, and to do this in a simple, light and economical structure.

Figure 1:
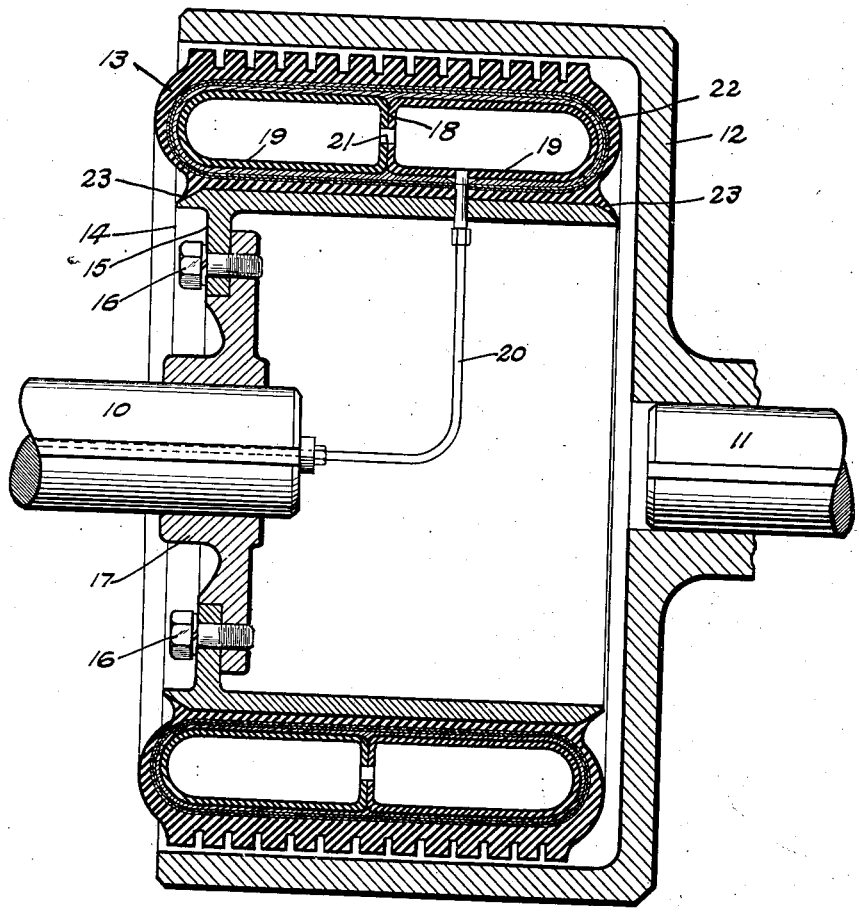
Fig. 1 is a medial section of a clutch assembly embodying my invention in one of its preferred forms.

Referring to the drawing, the assembly of Fig. 1 comprises a pair of shafts in series, of which shaft 10 may be considered as the driving shaft and shaft 11 as the driven shaft.

Secured upon the shaft 11 is a bell-shaped member 12 having a preferably cylindrical inner face adapted to be frictionally engaged by an elastic tire-like fluid-container 13, to be driven thereby.

In the assembly here shown the fluid-container 13 is secured as by vulcanization upon an annular rim member 14 which is formed with a radial internal flange 15 which is secured, as by bolts 16, 16, to a hub member 17 mounted upon the shaft 10.

Built into the fluid container and preferably vulcanized to the inner face of the rubber member 13 and also to each other in their middle zones where they abut each other, at 18, are a pair of annular rubber tubes 19, 19 which together provide a fluid-tight lining for the tire-like member 13 and also provide, in their walls which are secured together at 18, an annular web requiring to be stretched radially for engagement of the clutch and to retract, by reason of its elasticity, upon the venting of the fluid-container, for quickly withdrawing the tread portion of the member 13 from the inner face of the bell-shaped member 12, and thus effecting prompt and complete clutch-disengagement.

In order that a single charging and venting conduit, 20, may be employed for both of the tubes 19, they are formed with at least one pair of registered apertures, as at 21.

The tire-like fluid-container, composed chiefly of rubber or the like, may be reinforced with cords such as the cords 22, and preferably the rubber is extended to a feathered edge on a bevel margin on each side of the rim member 14, as at 23, 23, to avoid a lifting and tearing away of the rubber at those positions.

Figure 2:
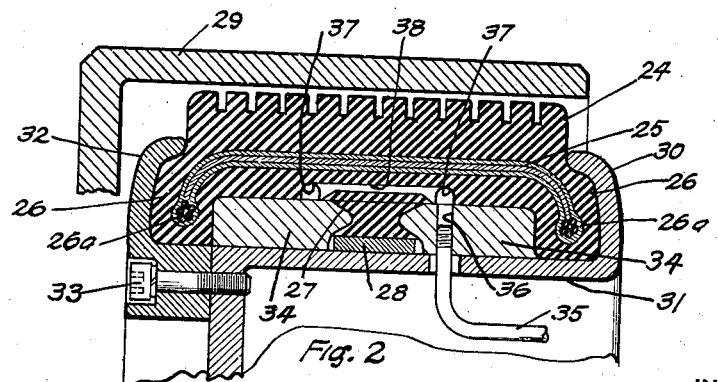
Fig. 2 is a fragmentary medial section of a modification.

In the embodiment shown in Fig. 2, a tire like member 24, permissibly reinforced with cords 25, is formed with bead portions 26, 26 which may include bead cores 26ª, 26ª and with an internal middle rib or web 27 which preferably is vulcanized to a metal anchoring ring 28 adapted to hold the inner periphery of the web against expansion so that the web is stretched radially as the tire-like member is distended by fluid into contact with a bell member 29 for clutch engagement, and, by its recoil, assures prompt and complete disengagement of the clutch upon the venting of the tire-like member.

The bead portions 26 of the tire-like member are clamped, by a flange 30 of its rim member, 31, and by a clamping flange 32, under the force of cap screws such as the screw 33, against spacer rings 34, 34 which interfit with and clamp the internal middle rib or web 28 as a further anchorage of the latter.

Thus the flanges 30 and 32 are sealed to the bead portions 26 of the tire-like member and the latter are sealed to the spacer rings 34, which in turn are sealed to the middle rib or web 26.

For conducting fluid into the tire-like member, to force it away from the spacer rings and against the bell member 29, a fluid-conducting pipe 35 is mounted in a hole 36 formed in one of the spacer rings and having communication with longitudinal distributing grooves 37, 37 formed in the inner face of the tire-like member and connected by at least one transverse groove 38.

The mode of operation of each of these embodiments will be clear from the foregoing description.

The invention obviously is also applicable to brakes of analogous types as well as to clutches.

Subject matter disclosed in this application is described and more broadly claimed in my Patents No. 2,111,422, granted March 15, 1938, and No. 2,141,645, granted December 27, 1938, and some of the subject matter disclosed in this application is disclosed and is claimed in other combinations in my copending applications Ser. No. 101,638, filed September 19, 1936; Ser. No. 131,656, filed March 18, 1937; Ser. No. 158,591;

filed August 11, 1937; Ser. No. 158,592, filed August 11, 1937; and No. 198,259, filed March 26, 1938.

I claim:

1. A clutch comprising an outer member having a frictional-engagement face, and an inner structure comprising an outwardly distensible fluid-container adapted to be distended by fluid pressure for effecting clutch engagement, said fluid container being provided with an elastic internal tie member requiring to be stretched radially of the assembly for clutch engagement and adapted by reason of its elasticity to expedite clutch-disengagement upon the venting of the fluid-container.

2. A clutch comprising an outer member having a frictional-engagement face, and an inner structure comprising a circumferentially disposed torque-transmitting strip of stretchable material adapted to be stretched outwardly to effect clutch engagement, means for so stretching the strip, and elastic means additional to the strip for yieldingly resisting the outward stretching of the strip.

3. In apparatus of the character described, the combination of outer and inner relatively rotary structures adapted for frictional engagement with each other, the inner structure comprising an outwardly distensible fluid container adapted to be distended by fluid pressure for effecting frictional engagement of the structures, said fluid container being provided with an elastic internal tie member requiring to be stretched radially of the assembly for such engagement and adapted by reason of its elasticity to expedite disengagement upon venting of the fluid-container.

4. In apparatus of the character described, the combination of outer and inner relatively rotary structures adapted for frictional engagement with each other, the inner structure comprising a circumferentially disposed torque-transmitting strip of stretchable material adapted to be stretched outwardly to effect frictional engagement of the structures, means for so stretching the strip, and elastic means additional to the strip for yieldingly resisting the outward movement of the strip.

5. In apparatus of the character described, the combination of outer and inner relatively rotary structures adapted for frictioal engagement with each other, the inner structure comprising an outwardly distensible fluid container adapted to be distended by fluid pressure for effecting frictional engagement of the structures, said fluid container being provided with an elastic internal tie member requiring to be stretched radially of the assembly for such engagement and adapted by reason of its elasticity to expedite disengagement upon venting of the fluid-container, the said elastic internal tie member being substantially integral with the outer wall of the fluid-container.

6. In apparatus of the character described, the combination of outer and inner relatively rotary structures adapted for frictional engagement with each other, the inner structure comprising an outwardly distensible fluid container adapted to be distended by fluid pressure for effecting frictional engagement of the structures, said fluid container being provided with an elastic internal tie member requiring to be stretched radially of the assembly for such engagement and adapted by reason of its elasticity to expedite disengagement upon venting of the fluid-container, the said elastic internal tie member being a circumferentially disposed web substantially integral with the outer wall of the fluid-container.

7. In apparatus of the character described, the combination of outer and inner relatively rotary structures adapted for frictional engagement with each other, the inner structure comprising a circumferentially disposed torque-transmitting strip of stretchable material adapted to be stretched outwardly to effect frictional engagement of the structures, means for so stretching the strip, and elastic means additional to the strip for yieldingly resisting the outward movement of the strip, the said elastic means being substantially integral with the strip.

8. In apparatus of the character described, the combination of outer and inner relatively rotary structures adapted for frictional engagement with each other, the inner structure comprising a circumferentially disposed torque-transmitting strip of stretchable material adapted to be stretched outwardly to effect frictional engagement of the structures, means for so stretching the strip, and elastic means additional to the strip for yieldingly resisting the outward movement of the strip, the said elastic means being a circumferentially disposed web substantially integral with the strip.

9. A driving clutch element comprising a fluid pressure bag having an internal elastic tie for resisting centrifugal force.

10. A driving clutch element comprising a fluid pressure bag of axially oblong cross-sectional form having an internal elastic tie for resisting centrifugal force.

11. A driving clutch element comprising an endless stretchable strip of material and elastic means additional to the strip for resisting centrifugal stretching of the strip.

THOMAS L. FAWICK.